US011312512B1

(12) United States Patent
Bettinger (10) Patent No.: US 11,312,512 B1
(45) Date of Patent: Apr. 26, 2022

(54) EARLY WARNING REENTRY SYSTEM COMPRISING HIGH EFFICIENCY MODULE FOR DETERMINING SPACECRAFT REENTRY TIME

(71) Applicant: Government of the United States, as represented by the Secretary of the Air Force, Wright-Patterson AFB, OH (US)

(72) Inventor: Robert A. Bettinger, Oakwood, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 302 days.

(21) Appl. No.: 16/352,936

(22) Filed: Mar. 14, 2019

Related U.S. Application Data (60) Provisional application No. 62/813,300, filed on Mar. 4, 2019.

(51) Int. Cl.
*B64G 1/62* (2006.01)
*B64G 1/52* (2006.01)

(52) U.S. Cl.
CPC ................ *B64G 1/52* (2013.01); *B64G 1/62* (2013.01)

(58) Field of Classification Search
CPC .............. B64G 1/52; B64G 1/62; B64G 3/00; B64G 9/00; G01C 21/24
See application file for complete search history.

(56) References Cited

U.S. PATENT DOCUMENTS

2015/0331080 A1  11/2015  Sgobba

OTHER PUBLICATIONS

Bettinger, R., Black, J., and Agte, J. "Design of Experiment Approach to Atmospheric Skip Entry Maneuver Optimization." Journal of Spacecraft and Rockets, vol. 52, No. 3, (May-Jun. 2015), pp. 813-826 (Year: 2015).*

Bettinger, R. "Linear Model for Reentry Time Prediction of Spacecraft in Low-Eccentricity, Low Earth Orbits." Journal of Spacecraft and Rockets, vol. 56, No. 5 (Sep.-Oct. 2019), pp. 1300-1311 (Year: 2019).*

Saunders, A., Swinerd, G., Lewis, S. "Deriving Accurate Satellite Ballistic Coefficients from Two-Line Element Data." Journal of Spacecraft and Rockets, vol. 49, No. 1 (Jan.-Feb. 2012), pp. 175-184 (Year: 2012).*

(Continued)

*Primary Examiner* — Nadeem Odeh
(74) *Attorney, Agent, or Firm* — AFMCLO/JAZ; James F. McBride (57) ABSTRACT

The present invention relates to an early warning reentry system comprising a high efficiency module for determining spacecraft reentry time and a highly efficient method for determining spacecraft reentry time. The method permits more accurate, earlier spacecraft reentry time determinations using publicly available trajectory information without the need for accounting for the actual design configuration of the spacecraft in question. Thus, a module for making such determinations can easily and inexpensively be added to an early warning reentry system.

8 Claims, 3 Drawing Sheets

(56) References Cited

OTHER PUBLICATIONS

Geul, J., Mooij, E., Noomen, R. "Analysis of Uncertainties and Modeling in Short-Term Reentry Predictions." Journal of Guidance, Control, and Dynamics, vol. 41, No. 6 (Jun. 2018), pp. 1276-1289 (Year: 2018).*
Gupta, S.; Anilkumar, A. K.; Integrated Model for Prediction of Reentry Time of Risk Objects J. Spacecraft, 2015, vol. 52, No. 1, 295-299.
Ikeda, S.; Tajima, T.; Abe, J.; Matsuda, I.; Improved Re-Entry Prediction Method Using the Last-Minute Motion of Re-Entering Objects, SpaceOps Conferences 2014, 1-9.
M. Mutyalarao, M.; Sharma, R. K.; J. Spacecraft, 2010, vol. 47, No. 4, 686-690.
Yurasov, V. S.; Nazarenko, A. I.; Alfriend, K. T.; Paul J. Cefola, P. J.; Journal of Guidance, Control, and Dynamics, 2008, vol. 31, No. 2, 282-289.

* cited by examiner

EARLY WARNING REENTRY SYSTEM COMPRISING HIGH EFFICIENCY MODULE FOR DETERMINING SPACECRAFT REENTRY TIME

CROSS-REFERENCE TO RELATED APPLICATIONS

Pursuant to 37 C.F.R. § 1.78(a)(4), this application claims the benefit of and priority to prior filed U.S. Provisional Application Ser. No. 62/813,300, filed Mar. 4, 2019, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates to an early warning reentry system comprising a high efficiency module for determining spacecraft reentry time and a highly efficient method for determining spacecraft reentry time.

BACKGROUND OF THE INVENTION

There are over 3700 satellites orbiting earth. Such satellites range in mass from a few kilograms to over 129,000 kilograms and travel approximately 28,000 kilometers per hour. Due to the size of the larger satellites, they do not burn up on reentry. If a relatively large satellite were to impact a densely populated area without warning, loss of life and significant crash site damage is a possibility.

Recent uncontrolled atmospheric reentries of low Earth orbiting spacecraft have further highlighted the necessity of accurate reentry time and location predictions. With the case of April 2018 reentry of Tiangong-1, which had a mass of 8,523 kilograms and a speed of approximately 28,000 kilometers per hour, global media outlets reported a variety of reentry predictions from various governmental and industry sources which served to mobilize both public interest and fear. Current early warning systems employ methods of predicting spacecraft reentry times that are unsatisfactory as they require a large number of complex inputs that are not publicly available as they are classified and/or require proprietary data that is not publically available. Such complexity increases the expense associated with making the reentry time prediction and shortens the event window of the prediction—as such predictions are typically made only hours out and at most two or three days out. Furthermore, due to the expense and complexity of current methodologies, early warning reentry systems, such as systems comprising radar are not generally available to the public. Thus, what is needed is an early warning reentry system that comprises a module employing a methodology that is accurate, that can use publically available data to predict reentry and that can provide a reentry prediction warning at least five days out.

Applicant recognized that the source of the problems associated with current prediction methods lie in the use of three complex inputs. Specifically, the subject spacecraft's exact design configuration, the spacecraft's exact aerodynamics and a precise atmospheric input. Applicants discovered that when significantly simplified versions of the aforementioned inputs are used, an improved reentry early warning system is obtained as such recognition allows for a high efficiency module for determining spacecraft reentry time and a highly efficient method for determining spacecraft reentry time without any negatives being introduced.

SUMMARY OF THE INVENTION

The present invention relates to an early warning reentry system comprising a high efficiency module for determining spacecraft reentry time and a highly efficient method for determining spacecraft reentry time. The method permits more accurate, earlier spacecraft reentry time determinations using publicly available trajectory information without the need for accounting for the actual design configuration of the spacecraft in question. Thus, a module for making such determinations can easily and inexpensively be added to an early warning reentry system.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

BACKGROUND

Nomenclature and Paragraph Numbering For purposes of this specification, headings are not considered paragraphs and thus this paragraph is Paragraph 0017 of the present specification. The individual number of each paragraph above and below this paragraph can be determined by reference to this paragraph's number.

$C_D$, $C_L$=drag and lift coefficients, respectively
D=aerodynamic drag force, N
g=gravitational acceleration, m/s$^2$
L=aerodynamic lift force, N
m=vehicle mass, kg
r=geocentric radial distance, m
t=time, s
S=reference area, m$^2$
V=velocity, m/s
β=Inverse atmospheric scale height, 1/m
γ=flight-path angle, deg
θ=longitude, deg
μ=gravitational parameter, m$^3$/s$^2$
ρ=atmospheric density, kg/m$^3$
σ=bank angle, deg
φ=latitude, deg
ψ=heading angle, deg
$\omega_{(\cdot)}$=planetary rotation rate, rad/s
Subscripts
I=measured with respect to an inertial frame
R=measured with respect to a rotating frame
RE=reentry condition
SL=sea-level condition
⊕=conditions for the Earth The reentry prediction method implements low-order dynamics and environmental models to perform the prediction computation. For all simulations, the planetary model is assumed to be rotating, with a spherical geometry and gravity potential. With the exception of aerodynamic drag, all orbital perturbations are considered negligible and orbital motion is governed by two-body dynamics. For each reentry time prediction case, the spacecraft is considered a point mass that remains constant throughout the reentry trajectory, with non-rotating attitude dynamics, and zero bank angle. Attitude dynamics are ignored due to the fidelity of trajectory data provided by TLEs. Although spacecraft attitude information during reentry may be available, the prediction algorithm only utilizes a single data source in the form of TLEs to initialize the three-degree-of-freedom reentry dynamics model. Finally, various planetary and atmospheric parameters are modeled as constant values and are outlined in Table 1:

TABLE 1

| Earth-Based Constants | |
|---|---|
| Constant | Value |
| Gravitational Parameter, $\mu_\oplus$ | 398600.442 km$^3$/s$^2$ |
| Gravitational Acceleration at Sea-Level, $g_{SL}$ | 9.798 m/s$^2$ |
| Planetary Radius, $r_\oplus$ | 6378.137 km |
| Atmospheric Density at Sea-Level, $\rho_{SL}$ | 1.225 kg/m$^3$ |

Reentry Dynamics Model

For the reentry prediction method, "atmospheric reentry" is defined as a terminal mission activity in which a given spacecraft descends into the sensible atmosphere following a period of orbit decay induced by atmospheric drag. Described by a system of six nonlinear differential equations, reentry is simulated by the following set of non-thrusting, kinematic and dynamical equations:

$$\dot{r}=V_R \sin \gamma \quad (1)$$

$$\dot{\theta}=(V_R \cos \gamma \cos \psi)/(r \cos \phi) \quad (2)$$

$$\dot{\phi}=V_R \cos \gamma \sin \psi/r \quad (3)$$

$$\dot{V}_R=-(D/m)-g(r)\sin \gamma+r\omega_\oplus^2 \cos \phi(\cos \phi \sin \gamma-\sin \phi \sin \psi \cos \gamma) \quad (4)$$

$$V_R\dot{\gamma}=(L/m)\cos \sigma-g(r)\cos \gamma+(V_R^2/r)\cos \gamma+2V_R\omega_\oplus \cos \phi \cos \psi+r\omega_\oplus^2 \cos \phi(\cos \phi \cos \gamma-\sin \phi \sin \phi \sin \gamma) \quad (5)$$

$$V_R\dot{\psi}=[(L \sin \sigma)/(m \cos \gamma)]-(V_R^2/r)\cos \gamma \cos \psi \tan \phi+2V_R\omega_\oplus(\sin \psi \cos \phi \tan \gamma-\sin \phi)-[(r\omega_\oplus^2)/\cos \gamma]\sin \phi \cos \phi \cos \psi \quad (6)$$

wherein the gravity term g and the aerodynamic forces of drag and lift are computed, respectively, by the following:

$$g(r)=g_{SL}(r_\oplus/r)^2 \quad (7)$$

$$D = \frac{1}{2}\rho C_D S V_R^2 \quad (8)$$

$$L = \frac{1}{2}\rho C_L S V_R^2 \quad (9)$$

Due to the point mass assumption, the gravitational force is directed from the point mass to the center of the planetary body. As for aerodynamics, drag is assumed to act in the direction opposite to spacecraft velocity, while lift acts perpendicular to spacecraft velocity.

Atmospheric Density Model

Atmospheric density is modeled as a piecewise-continuous function of altitude, with Equation (10) first employing an exponential model for altitudes below 84 km. For the altitude regime 84≤h≤120 km, the model accounts for variations in the inverse scale height, with α and $\beta_H$ representing dimensionless parameters corresponding to specific sections of the atmosphere as defined in Table 2. For the final altitude regime of 120≤h≤1000 km, the atmospheric density is modeled according to a regression curve fit of MSIS-E-90 empirical density data obtained for the latitude/longitude coordinates (θ,φ)=(0,0) deg on 1 Jan. 2000-2012, 12:00:00.00 Coordinated Universal Time (UTC). For all altitudes above the 1,000 km threshold, the density is assumed to be negligible. In addition, all contributions to atmospheric density variation due to solar cycle activity are ignored.

$$\rho(h) = \begin{cases} \rho_{SL}e^{-\beta h}, & h < 84 \text{ km} \\ \rho_i\left[\left(1+\delta_H\left(\dfrac{h-h_i}{r_\oplus}\right)\right)^{-1}\right]^{\frac{1+\alpha}{\alpha}}, & 84 \le h \le 120 \text{ km} \\ (4.50847623 \times 10^7)\cdot(h)^{-7.44605852}, & 120 < h \le 1000 \text{ km} \end{cases} \quad (10)$$

Values for the parameters $\rho_i$, $\alpha$, and $\beta_H$ are given in Table 2 below, and the value for the inverse scale height in the first function of Equation (10) is 0.14 km$^{-1}$.

TABLE 2

Atmospheric Density Model Parameters

| Altitude Section | $h_i$, km | $\rho_i$, kg/m$^3$ | $\alpha$ | $\delta_H$ |
|---|---|---|---|---|
| 84 ≤ h ≤ 90 km | 85 | 7.726 × 10$^{-6}$ | 0.1545455 | 197.9740 |
| 91 ≤ h ≤ 106 km | 99 | 4.504 × 10$^{-7}$ | 0.1189286 | 128.4577 |
| 107 ≤ h ≤ 120 km | 110 | 5.930 × 10$^{-8}$ | 0.5925240 | 432.8484 |

Highly Efficient Method for Determining Spacecraft Reentry Time

Applicants disclose a method of determining spacecraft reentry time comprising:

a) computing, based on the spacecraft diameter/width, length, and mass, the minimum and maximum reference area of a cylinder approximating spacecraft configuration (all spacecraft protrusions such as solar panels are not taken into account when the diameter/width, length, and mass of the spacecraft is used to make such computation);

b) computing the minimum reference area ($S_{min}$) which is the area of one end of said cylinder and compute the maximum reference area ($S_{max}$) which is the rectangular area projection of the cylinder's longitudinal axis;

c) incrementing the interval [$S_{min}$, $S_{max}$] to achieve from about 10 drag reference area cases to about 50 drag reference area cases, preferably from about 10 drag reference area cases to about 30 drag reference area cases;

d) taking, from the Two Line Element (TLE) data for the spacecraft of interest, the first available data point within the set of h[250, 350], preferably take the first available data point within the set of h[250, 300] wherein h is the mean altitude of the spacecraft's reentry trajectory and extract the values for time in elapsed days since epoch, mean anomaly in degrees, mean motion in revolutions per day, orbit inclination in degrees, argument of perigee in degrees, right ascension of the ascending node in degrees, and eccentricity which is unit less then, converting all values in degrees to radians, and converting mean motion from revolutions per day to radians per second (the required Two Line Element data can be obtained directly from NORAD or from NORAD's outward facing website www.Celestrak.com);

e) computing, from the Two Line Element data, the inertial position ($\vec{r}^I$) and velocity ($\vec{V}^I$) vectors related to the spacecraft motion at the specified Two Line Element time from Step d), said velocity vector being converted to a quantity relative to the rotating Earth and said computation using the following initial conditions, wherein the subscript "0" represents an initial condition and the symbol $\|\cdot\|$ is the vector magnitude operation:

$r_0 = \|\vec{r}^I\|$ $V^R = \|\vec{V}^R\|$ $\theta_0 = -10° = +0.17453$ rad $\phi_0 = -10° = -0.17453$ rad $\gamma_0 = (\pi/2) - \cos^{-1}[(\vec{r}^I \cdot \vec{V}^R)/(\|\vec{r}^I\|\|\vec{V}^R\|)]$ $\psi_0 = (\pi/2) - \cos^{-1}[(\vec{V}^R \cdot [0\ 0\ 1])/\|\vec{V}^R\|]$;

Such computation can be performed using publicly available mathematical techniques, such as solving Kepler's problem for the angle true anomaly and converting classical orbital elements to the inertial reference frame via the perifocal reference frame, the computed values are compatible with the atmospheric reentry equations of motion given by Equations (1)-(6) and such initial conditions are derived from conversion of the TLE data and empirical research;

f) inserting the values from Step e) as initial conditions in Equations (1)-(10)

g) integrating Equations (1)-(6), until the trajectory radial position of the spacecraft, with respect to the center of the Earth, is equal to plus or minus 10 kilometres of the constant mean radius of the Earth (6378.137 km), for the following cases:

(i) Reference Area Response Curve: every reference area increment in the interval [$S_{min}$; $S_{max}$] with $C_D$=2.5 and $C_L$=0.5 to yield a series of re-entry time predictions;

(ii) Lowest-Drag/Highest-Lift Condition: $S=S_{min}$, $C_D$=2.0, $C_L$=1.0 to yield a first re-entry time prediction;

(iii) Highest-Drag/Lowest-Lift Condition: $S=S_{max}$, $C_D$=3.0, $C_L$=0.1 to yield a second re-entry time prediction;

$$\dot{r} = V_R \sin\gamma \quad (1)$$

$$\dot{\theta} = (V_R \cos\gamma \cos\psi)/(r\cos\phi) \quad (2)$$

$$\dot{\phi} = V_R \cos\gamma \sin\psi / r \quad (3)$$

$$\dot{V}_R = -(D/m) - g(r)\sin\gamma + r\omega_\oplus^2 \cos\phi(\cos\phi \sin\gamma - \sin\phi \sin\psi \cos\gamma) \quad (4)$$

$$V_R\dot{\gamma} = (L/m)\cos\sigma - g(r)\cos\gamma + (V_R^2/r)\cos\gamma + 2V_R\omega_\oplus \cos\phi \cos\psi + r\omega_\oplus^2 \cos\phi(\cos\phi \cos\gamma - \sin\phi \sin\psi \sin\gamma) \quad (5)$$

$$V_R\dot{\psi} = [(L\sin\sigma)/(m\cos\gamma)] - (V_R^2/r)\cos\gamma \cos\psi \tan\phi + 2V_R\omega_\oplus(\sin\psi \cos\phi \tan\gamma - \sin\phi) - [(r\omega_\oplus^2)/\cos\gamma]\sin\phi \cos\phi \cos\psi \quad (6)$$

wherein the gravity term g and the aerodynamic forces of drag (D) and lift (L) are computed, respectively, by the following:

$$g(r) = g_{SL}(r_\oplus/r)^2 \quad (7)$$

$$D = \frac{1}{2}\rho C_D S V_R^2 \quad (8)$$

$$L = \frac{1}{2}\rho C_L S V_R^2 \quad (9)$$

wherein $\rho$ for Equations (8) and (9) is calculated as follows:

$$\rho(h) = \begin{cases} \rho_{SL}e^{-\beta h}, & h < 84 \text{ km} \\ \rho_i\left[\left(1+\delta_H\left(\dfrac{h-h_i}{r_\oplus}\right)\right)^{-1}\right]^{\frac{1+\alpha}{\alpha}}, & 84 \le h \le 120 \text{ km} \\ (4.50847623 \times 10^7)\cdot(h)^{-7.44605852}, & 120 < h \le 1000 \text{ km} \end{cases} \quad (10)$$

the value for the inverse scale height in the first function of Equation (10) is 0.14 km$^{-1}$ and the values for the parameters $\rho_i$, $\alpha$, and $\delta_H$ are:

| Altitude Section | $h_i$, km | $\rho_i$, kg/m$^3$ | $\alpha$ | $\delta_H$ |
|---|---|---|---|---|
| 84 ≤ h ≤ 90 km | 85 | 7.726 × 10$^{-6}$ | 0.1545455 | 197.9740 |
| 91 ≤ h ≤ 106 km | 99 | 4.504 × 10$^{-7}$ | 0.1189286 | 128.4577 |
| 107 ≤ h ≤ 120 km | 110 | 5.930 × 10$^{-8}$ | 0.5925240 | 432.8484 |

A suitable integration method is RUNGE-KUTTA fourth-order numerical integration method.

h) plotting each re-entry time prediction from said series of re-entry time predictions obtained via Step g) (i) against each respective interval [$S_{min}$, $S_{max}$] used to generate each of said respective re-entry time predictions;

i) performing a fourth-order polynomial regression fit on the plot from Step h) and determine the y intercept of the resulting equation;

j) computing the difference between the re-entry time predictions from Steps g) (ii) and (iii); (such difference is synonymous with the term "span")

k) forming an (x, y) pair wherein x is the difference obtained from Step j) and y is the y intercept from Step i) and plot said (x, y) pair;

l) repeating Steps d) through k) to generate an additional (x, y) pair using a subsequently available Two Line Element within the set of h[120, 350], wherein h is the mean altitude of the spacecraft's reentry trajectory, with proviso that said subsequently available Two Line Element corresponds to an altitude h that is less than the altitude of the previous data point used to generate the previous (x, y) pair; preferably repeat Steps d) through k) from about 5 to about 15 times;

m) plotting said (x, y) pairs and preform a linear regression fit on said plotted points to obtain a linear equation;

n) determining the y intercept of said linear equation which is designated as the re-entry time prediction of said spacecraft.

Applicants disclose a method of determining spacecraft reentry time comprising determining the y intercept of a linear equation which is designated as the re-entry time prediction of said spacecraft, said linear equation being generated by:

a) computing, based on the spacecraft diameter/width, length, and mass, the minimum and maximum reference area of a cylinder approximating spacecraft configuration (all spacecraft protrusions such as solar panels are not taken into account when the diameter/width, length, and mass of the spacecraft is used to make such computation);

b) computing the minimum reference area ($S_{min}$) which is the area of one end of said cylinder and compute the maximum reference area ($S_{max}$) which is the rectangular area projection of the cylinder's longitudinal axis;

c) incrementing the interval [$S_{min}$, $S_{max}$] to achieve from about 10 drag reference area cases to about 50 drag reference area cases, preferably from about 10 drag reference area cases to about 30 drag reference area cases;

d) taking, from the Two Line Element data for the spacecraft of interest, the first available data point within the set of h[250, 350], preferably take the first available data point within the set of h[250, 300] wherein h is the mean altitude of the spacecraft's reentry trajectory and extract the values for time in elapsed days since epoch, mean anomaly in degrees, mean motion in revolutions per day, orbit inclination in degrees, argument of perigee in degrees, right ascension of the ascending node in degrees, and eccentricity which is unit less then, converting all values in degrees to radians, and converting mean motion from revolutions per day to radians per second; (the required Two Line Element data can be obtained directly from NORAD or from NORAD's outward facing web site www.Celestrak.com.)

e) computing, from the Two Line Element data, the inertial position ($\vec{r}^I$) and velocity ($\vec{V}^I$) vectors related to the spacecraft motion at the specified Two Line Element time from Step d), said velocity vector being converted to a quantity relative to the rotating Earth and said computation using the following initial conditions, wherein the subscript "0" represents an initial condition and the symbol ||•|| is the vector magnitude operation:

$r_0 = \|\vec{r}^I\|$ $V^R = \|\vec{V}^R\|$ $\theta_0 = -10° = +0.17453$ rad $\phi_0 = -10° = -0.17453$ rad $\gamma_0 = (\pi/2) - \cos^{-1}[(\vec{r}^I \cdot \vec{V}^R)/(\|\vec{r}^I\|\|\vec{V}^R\|)]$ $\psi_0 = (\pi/2) - \cos^{-1}[(\vec{V}^R \cdot [0\ 0\ 1])/\|\vec{V}^R\|]$;

Such computation can be performed using publicly available mathematical techniques, such as solving Kepler's problem for the angle true anomaly and converting classical orbital elements to the inertial reference frame via the perifocal reference frame, the computed values are compatible with the atmospheric reentry equations of motion given by Equations (1)-(6) and such initial conditions are derived from conversion of the TLE data and empirical research.

f) inserting the values from Step e) as initial conditions in Equations (1)-(10)

g) integrating Equations (1)-(6), until the trajectory radial position of the spacecraft, with respect to the center of the Earth, is equal to plus or minus 10 kilometres of the constant mean radius of the Earth (6378.137 km), for the following cases:

(i) Reference Area Response Curve: every reference area increment in the interval [$S_{min}$; $S_{max}$] with $C_D$=2.5 and $C_L$=0.5 to yield a series of re-entry time predictions;

(ii) Lowest-Drag/Highest-Lift Condition: S=$S_{min}$, $C_D$=2.0, $C_L$=1.0 to yield a first re-entry time prediction;

(iii) Highest-Drag/Lowest-Lift Condition: S=$S_{max}$, $C_D$=3.0, $C_L$=0.1 to yield a second re-entry time prediction;

$$\dot{r} = V_R \sin \gamma \quad (1)$$

$$\dot{\theta} = (V_R \cos \gamma \cos \psi)/(r \cos \phi) \quad (2)$$

$$\dot{\phi} = V_R \cos \gamma \sin \psi / r \quad (3)$$

$$\dot{V}_R = -(D/m) - g(r)\sin \gamma + r\omega_\oplus^2 \cos \phi(\cos \phi \sin \gamma - \sin \phi \sin \psi \cos \gamma) \quad (4)$$

$$V_R\dot{\gamma} = (L/m)\cos \sigma - g(r)\cos \gamma + (V_R^2/r)\cos \gamma + 2V_R\omega_\oplus \cos \phi \cos \psi + r\omega_\oplus^2 \cos \phi(\cos \phi \cos \gamma - \sin \phi \sin \psi \sin \gamma) \quad (5)$$

$$V_R\dot{\psi} = [(L \sin \sigma)/(m \cos \gamma)] - (V_R^2/r)\cos \gamma \cos \psi \tan \phi + 2V_R\omega_\oplus(\sin \psi \cos \phi \tan \gamma - \sin \phi) - [(r\omega_\oplus^2)/\cos \gamma]\sin \phi \cos \phi \cos \psi \quad (6)$$

wherein the gravity term g and the aerodynamic forces of drag (D) and lift (L) are computed, respectively, by the following:

$$g(r) = g_{SL}(r_\oplus/r)^2 \quad (7)$$

$$D = \frac{1}{2}\rho C_D S V_R^2 \quad (8)$$

$$L = \frac{1}{2}\rho C_L S V_R^2 \quad (9)$$

wherein ρ for Equations (8) and (9) is calculated as follows:

$$\rho(h) = \begin{cases} \rho_{SL} e^{-\beta h}, & h < 84 \text{ km} \\ \rho_i \left[ \left(1 + \delta_H \left(\frac{h-h_i}{r_\oplus}\right)\right)^{-1} \right]^{\frac{1+\alpha}{\alpha}}, & 84 \le h \le 120 \text{ km} \\ (4.50847623 \times 10^7) \cdot (h)^{-7.44605852}, & 120 < h \le 1000 \text{ km} \end{cases} \quad (10)$$

the value for the inverse scale height in the first function of Equation (10) is 0.14 km$^{-1}$ and the values for the parameters $\rho_i$, α, and $\delta_H$ are:

| Altitude Section | $h_i$, km | $\rho_i$, kg/m$^3$ | α | $\delta_H$ |
|---|---|---|---|---|
| 84 ≤ h ≤ 90 km | 85 | 7.726 × 10$^{-6}$ | 0.1545455 | 197.9740 |
| 91 ≤ h ≤ 106 km | 99 | 4.504 × 10$^{-7}$ | 0.1189286 | 128.4577 |
| 107 ≤ h ≤ 120 km | 110 | 5.930 × 10$^{-8}$ | 0.5925240 | 432.8484 |

A suitable integration method is RUNGE-KUTTA fourth-order numerical integration method.

h) plotting each re-entry time prediction from said series of re-entry time predictions obtained via Step g) (i) against each respective interval [$S_{min}$, $S_{max}$] used to generate each of said respective re-entry time predictions;

i) performing a fourth-order polynomial regression fit on the plot from Step h) and determine the y intercept of the resulting equation;

j) computing the difference between the re-entry time predictions from Steps g) (ii) and (iii); (such difference is synonymous with the term "span")

k) forming an (x, y) pair wherein x is the difference obtained from Step j) and y is the y intercept from Step i) and plot said (x, y) pair;

l) repeating Steps d) through k) to generate an additional (x, y) pair using a subsequently available Two Line Element within the set of h[120, 350], wherein h is the mean altitude of the spacecraft's reentry trajectory, with proviso that said subsequently available Two Line Element corresponds to an altitude h that is less than the altitude of the previous data point used to generate the previous (x, y) pair; preferably repeat Steps d) through k) from about 5 to about 15 times;

m) plotting said (x, y) pairs and preform a linear regression fit on said plotted points to obtain a linear equation.

High Efficiency Module for Determining Spacecraft Reentry Time

Applicants disclose a module comprising a central processing unit programmed to predict spacecraft reentry time according to the method of Paragraph 21.

Applicants disclose a module comprising a central processing unit programmed to predict spacecraft reentry time according to the method of Paragraph 22.

Applicants disclose a module according to Paragraph 23 said module comprising an input/output controller, a random access memory unit, a hard drive memory unit, and a unifying computer bus system, said input/output controller being configured to receive a digital signal and transmit said signal to said central processing unit and retrieve a signal comprising the predicted spacecraft reentry time from said central processing unit.

Applicants disclose a module according to Paragraph 24 said module comprising an input/output controller, a random access memory unit, a hard drive memory unit, and a unifying computer bus system, said input/output controller being configured to receive a digital signal and transmit said signal to said central processing unit and retrieve a signal comprising the predicted spacecraft reentry time from said central processing unit.

Early Warning Reentry System Comprising a High Efficiency Module for Determining Spacecraft Reentry Time Applicants disclose an early warning reentry system comprising:

a) a module according to any of Paragraphs 23 through 26;

b) a transmitter for transmitting the spacecraft reentry determination provided by said module to a communication network c) an internal and/or external power source for powering said early warning early warning reentry system.

In the instance of an early warning reentry system, the input received into the system would be in the form of Two Line Element (TLE) data describing the trajectory information for a given space object at a specific moment in time. The TLE data results from the following process. First, space object observation and tracking information is retrieved from an established space surveillance network comprising, but not limited to, ground-based and space-based surveilling systems. These systems may be, but not limited to, optical and infrared detection devices implemented for the purposes of space object observation and tracking. As will be appreciated by the skilled artisan such systems may be customized to the specifications of the user.

Next, information retrieved from the space surveillance network is combined within a data fusion module to provide a single repository of space object information. Next, a data de-confliction and cataloguing operation is conducted following data fusion to associate space object observations with previously catalogued space objects and to minimize cross-association of observations between dissimilar space objects. The space objects contained in the catalog comprise active-mission spacecraft, retired or de-commissioned spacecraft, rocket bodies, and general debris. If a space object is observed that does not correspond to a known object within the catalog, then a new entry is created to account for the new, hitherto untracked and un-catalogued space object. The space object catalog comprises the most-recent trajectory information for a given space object, with the trajectory information formatted as a TLE. The TLE represents a standard trajectory data form for space objects which is universal in format and publicly available depending on the classification status of the given space object.

After the high efficiency reentry time prediction module receives the TLE data, the module computes the reentry time prediction for the given spacecraft. This prediction is then transmitted to a communication system which serves to provide notifications regarding the current reentry time prediction for the given spacecraft.

Examples

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The reentry prediction method is implemented for the historical reentry case of Tiangong-1, a defunct Chinese space station which performed an uncontrolled atmospheric reentry on 2 Apr. 2018. Estimates for Tiangong-1's mass and aerodynamic properties prior to reentry are as follows, with all information obtained and associated assumptions made from publicly-available sources:

1) A constant total mass of 8,500 kg is assumed due to limited information regarding mass reduction during the operational lifetime of Tiangong-1, including propellant expenditure and removal of equipment at the conclusion of habitation missions.
2) Due to uncertainties based on rarefied flow conditions and spacecraft flight orientation during the decay orbit, a drag coefficient $C_D$=2.5 is assumed based on historical engineering research pertaining to spacecraft drag analysis in the presence of rarefied atmospheric chemical species.
3) With the exception of spaceplane-class or manned spacecraft (e.g., capsules), satellites and space stations are not intended to operate within the sensible atmosphere and, consequently, are not designed for lifting flight and lift coefficients are, therefore, not computed. For Tiangong-1, parametric reentry simulations assumed a lift coefficient of $C_L$=0.5 based on historical data for Apollo and Soyuz capsules due to lack of an adequate surrogate representative model.
4) For reference area, the Tiangong-1 shape and configuration was reduced to a primitive cylinder shape, with any aerodynamic effects of the solar arrays assumed negligible. As a result of limited information regarding the space station's attitude or potential tumble, a rounded reference area interval of $S \in [9:1:30] m^2$ was assumed to account for all variations in reference area (excluding solar panels), with S=9 $m^2$ representing a circular area ($S_{min}$) and S=30 $m^2$ a projected rectangular area ($S_{max}$).

The TLE information was obtained for Tiangong-1 and a reentry prediction time computed for the dates outlined in Table 3. With most dates featuring multiple observations, the initial TLE for each date was used for consistency between campaigns.

TABLE 3

Selected TLE Dates for Tiangong-1 Reentry Time Prediction

| January | February | March | April |
|---|---|---|---|
| 1, 5, 10, 15, 20, 25 | 1, 5, 10, 15, 20, 25 | 1, 5, 10, 15, 20-31 | 1 |

Figure 1:
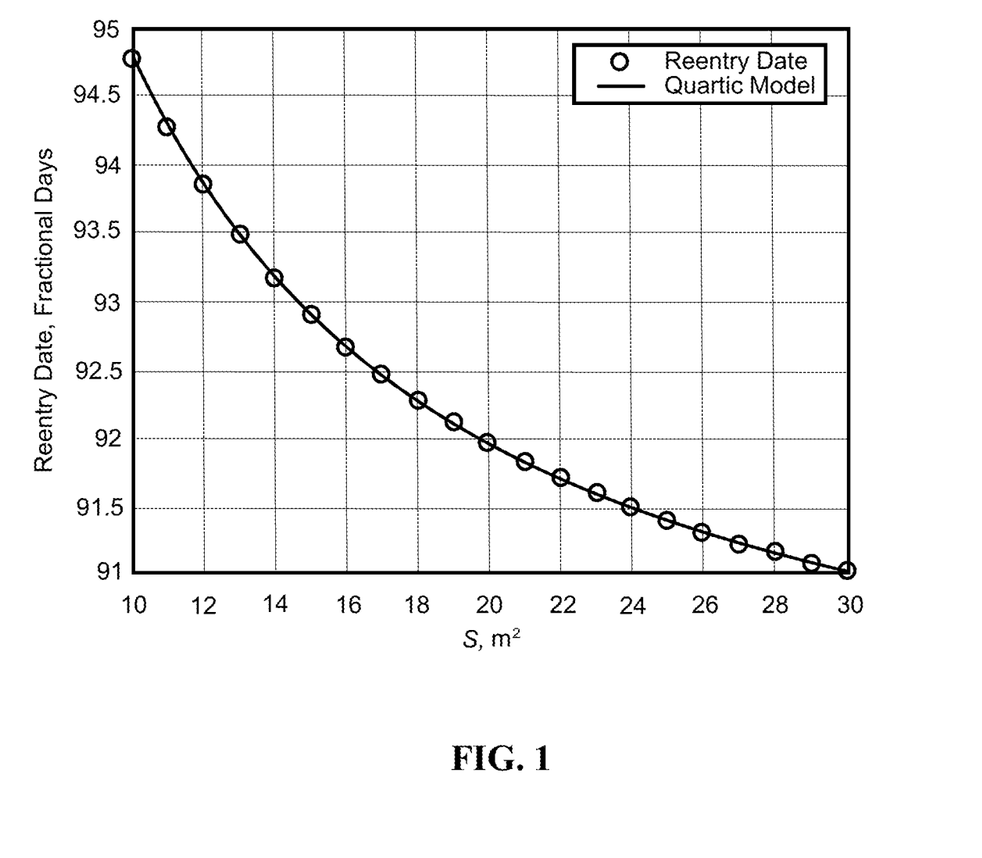
FIG. 1 is a Sample Tiangong-1 Reference Area Response Curve having a TLE Start Date of 30 Mar. 2018).

For each selected TLE, the computed trajectory initial conditions were inserted into Equations (1)-(10). Next, the equations of motion for atmospheric reentry, Equations (1)-(6), were integrated until the trajectory radial position of the spacecraft, with respect to the center of the Earth, was equal to plus or minus 10 kilometres of the constant mean radius of the Earth (6378.137 km). For each selected TLE, each reference area case within the interval [$S_{min}$, $S_{max}$] produced an intermediate reentry time prediction. These predictions do not represent the final prediction for the spacecraft, but rather temporary values necessary for computing the final prediction. With these intermediate reentry time predictions, a reference area response curve was plotted and a fourth-order polynomial fit to the data. A generic form of this polynomial is given by Equation (11) and shown graphically in FIG. 1:

$$y=f(S)=A_1S^4-A_2S^3+A_3S^2-A_4S+A_5 \quad (11)$$

wherein y is the predicted reentry time, S is the reference area, and $A_i$ is a polynomial coefficient. The polynomial y-intercept, given in Equation (11) as $A_5$, was retrieved from each reference area case (per TLE) and stored for later use.

Figure 2:
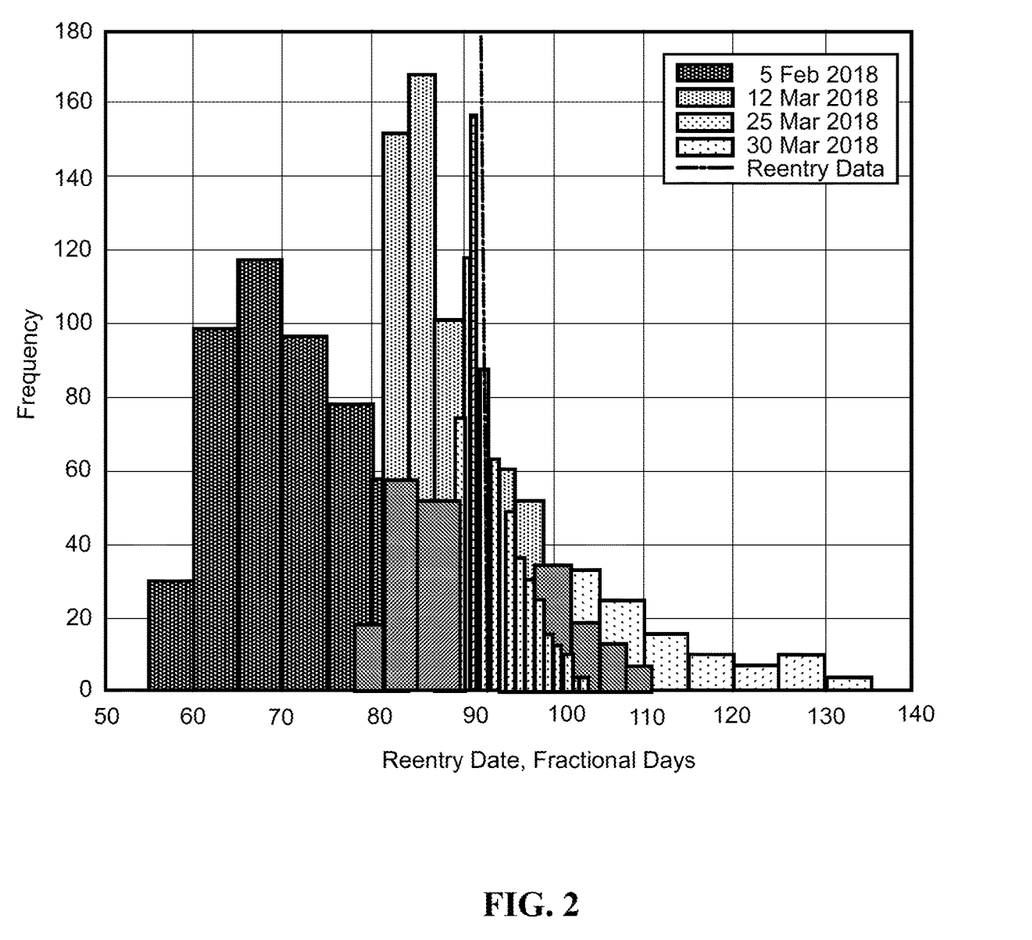
FIG. 2 Depicts Sample Reentry Time Histograms for Tiangong-1.

Constructed as histograms in FIG. 2, the reentry prediction times were binned and the number of predictions per bin, or prediction frequency, shown on the y-axis. Overall, the histograms form skewed unimodal distributions, with the upper and lower bounds of each distribution representing the span of potential reentry times for a given TLE start date and associated initial altitude. Illustrated in FIG. 2, the span decreases to zero as the TLE start date approaches the actual reentry date. Fundamentally, the span upper bound is a function of the lowest-drag, highest-lift simulation case: $C_D$=2.0, $C_L$=1.0, S=10 $m^2$; likewise, the span lower bound is a function of the highest-drag, lowest-lift simulation case: $C_D$=3.0, $C_L$=0.1, S=30 $m^2$.

Figure 3:
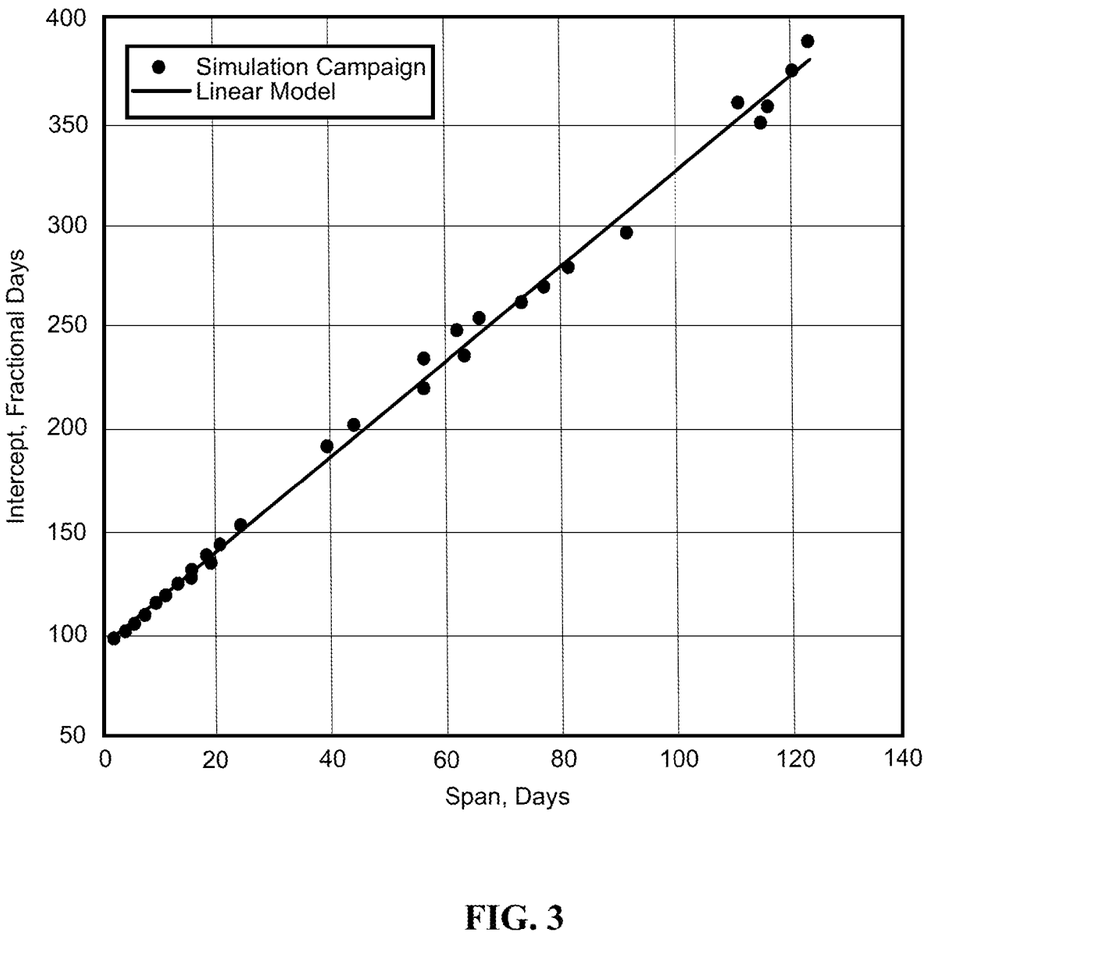
FIG. 3 Depicts the Tiangong-1 Reentry Time Prediction.

When plotted, the polynomial y-intercept from the reference area response curve and the span value from each TLE start date form a linear scatterplot. Shown in FIG. 3, the data point in upper right represents the 1 Jan. 2018 simulation campaign, while the data point in the lower left is the 1 Apr. 2018 simulation campaign. The resulting linear fit of the Tiangong-1 simulation campaigns is given by Equation (12) with a coefficient of determination of $R^2$=0.9965:

$$t_{intercept}=2.3082 t_{span}+94.892 \quad (12)$$

Where $t_{span}$ is the span and $t_{intercept}$ is the polynomial y-intercept, with both in units of fractional days. The critical aspect of Equation (12) is the linear function's y-intercept of 94.892: this value represents the resultant reentry time prediction for Tiangong-1 based on all selected TLEs outlined in Table 3. The reentry time prediction can be formulated with at least two simulation points–the minimum number of points to form a line. Although such a prediction is possible, accuracy of the prediction improves as the number of simulation campaigns increase. Compared with the actual reentry date of 2 Apr. 2018, 00:16 UTC (or 92.01152 as expressed in fractional days from 1 Jan. 2018, 00:00 UTC), the prediction of 94.892 deviates by 3.13%, or 69.13 hours.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of determining spacecraft reentry time comprising:
   a) computing, based on a diameter or width of a spacecraft, a length of the spacecraft, and a mass of the spacecraft, a minimum and maximum reference area of a cylinder approximating a spacecraft configuration;

b) computing, using the minimum and maximum reference area of said cylinder approximating the spacecraft configuration, the minimum reference area ($S_{min}$) which is an area of one end of said cylinder and computing the maximum reference area ($S_{max}$) which is a rectangular area projection of the cylinder's longitudinal axis;
c) incrementing an interval [$S_{min}$, $S_{max}$] to achieve from 10 drag reference area cases to 50 drag reference area cases;
d) taking, from a Two Line Element data for the spacecraft, a first available data point within a set of h[250, 350], wherein h is a mean altitude of the spacecraft's reentry trajectory and extracting values for time in elapsed days since epoch, mean anomaly in degrees, mean motion in revolutions per day, orbit inclination in degrees, argument of perigee in degrees, right ascension of an ascending node in degrees, and eccentricity which is unitless, then converting the mean anomaly, the orbit inclination, argument of perigee, and the right ascension of the ascending node in degrees to radians, and converting the mean motion from revolutions per day to radians per second;
e) computing, from the Two Line Element data, an inertial position vector ($\vec{r}^I$) and a velocity vector ($\vec{V}^I$) related to a spacecraft motion at a specified Two Line Element time from Step d), said velocity vector being converted to a quantity relative to the rotating Earth and said computation of the inertial position vector and the velocity vector using the following initial conditions, wherein a subscript "0" represents an initial condition and a symbol $\|\cdot\|$ is a vector magnitude operation:

$r_0 = \|\vec{r}^I\|$ $V^R = \|\vec{V}^R\|$ $\theta_0 = -10° = +0.17453$ rad $\phi_0 = -10° = -0.17453$ rad $\gamma_0 = (\pi/2) - \cos^{-1}[(\vec{r}^I \cdot \vec{V}^R)/(\|\vec{r}^I\|\|\vec{V}^R\|)]$ $\psi_0 = (\pi/2) - \cos^{-1}[(\vec{V}^R \cdot [0\ 0\ 1])/\|\vec{V}^R\|]$;

f) inserting the values ($r_0$), ($V^R$), ($\phi_0$), ($\phi_0$), ($\gamma_0$), and ($\psi_0$) from Step e) as initial conditions in Equations (1)-(10);
g) integrating Equations (1)-(6), until a trajectory radial position of the spacecraft, with respect to the center of the Earth, is equal to plus or minus 10 kilometres of the constant mean radius of the Earth, wherein the constant mean radius of the earth is 6378.137 km for the following cases:
  (i) Reference Area Response Curve: every reference area increment in the interval [$S_{min}$; $S_{max}$] with $C_D=2.5$ and $C_L=0.5$ to yield a series of re-entry time predictions;
  (ii) Lowest-Drag/Highest-Lift Condition: $S=S_{min}$, $C_D=2.0$, $C_L=1.0$ to yield a first re-entry time prediction;
  (iii) Highest-Drag/Lowest-Lift Condition: $S=S_{max}$, $C_D=3.0$, $C_L=0.1$ to yield a second re-entry time prediction;

$\dot{r} = V_R \sin\gamma$ (1)

$\dot{\theta} = (V_R \cos\gamma \cos\psi)/(r \cos\phi)$ (2)

$\dot{\phi} = V_R \cos\gamma \sin\psi / r$ (3)

$\dot{V_R} = -(D/m) - g(r)\sin\gamma + r\omega_\oplus^2 \cos\phi(\cos\phi\sin\gamma - \sin\phi\sin\psi\cos\gamma)$ (4)

$V_R\dot{\gamma} = (L/m)\cos\sigma - g(r)\cos\gamma + (V_R^2/r)\cos\gamma + 2V_R\omega_\oplus\cos\phi\cos\psi + r\omega_\oplus^2\cos\phi(\cos\phi\cos\gamma - \sin\phi\sin\phi\sin\gamma)$ (5)

$V_R\dot{\psi} = [(L\sin\sigma)/(m\cos\gamma)] - (V_R^2/r)\cos\gamma\cos\psi\tan\phi + 2V_R\omega_\oplus(\sin\psi\cos\phi\tan\gamma - \sin\phi) - [(r\omega_\oplus^2)/\cos\gamma]\sin\phi\cos\phi\cos\psi$ (6)

wherein a gravity term g and aerodynamic forces of drag (D) and lift (L) are computed, respectively, by the following:

$g(r) = g_{SL}(r_\oplus/r)^2$ (7)

$D = \frac{1}{2}\rho C_D S V_R^2$ (8)

$L = \frac{1}{2}\rho C_L S V_R^2$ (9)

wherein ρ for Equations (8) and (9) is calculated as follows:

$$\rho(h) = \begin{cases} \rho_{SL}e^{-\beta h}, & h < 84 \text{ km} \\ \rho_i\left[\left(1 + \delta_H\left(\frac{h-h_i}{r_\oplus}\right)\right)^{-1}\right]^{\frac{1+\alpha}{\alpha}}, & 84 \leq h \leq 120 \text{ km} \\ (4.50847623 \times 10^7) \cdot (h)^{-7.44605852}, & 120 < h \leq 1000 \text{ km} \end{cases}$$ (10)

the value for the inverse scale height β in the first function of Equation (10) is 0.14 km$^{-1}$ and the values for the parameters $\rho_i$, α, and $\delta_H$ are:

| Altitude Section | $h_i$, km | $\rho_i$, kg/m³ | α | $\delta_H$ |
|---|---|---|---|---|
| 84 ≤ h ≤ 90 km | 85 | 7.726 × 10$^{-6}$ | 0.1545455 | 197.9740 |
| 91 ≤ h ≤ 106 km | 99 | 4.504 × 10$^{-7}$ | 0.1189286 | 128.4577 |
| 107 ≤ h ≤ 120 km | 110 | 5.930 × 10$^{-8}$ | 0.5925240 | 432.8484 | h) plotting each re-entry time prediction from said series of re-entry time predictions obtained via Step g) (i) against each respective interval [$S_{min}$, $S_{max}$] used to generate each of said respective re-entry time predictions;
i) performing a fourth-order polynomial regression fit on the plot from Step h) and determining a y intercept of the resulting equation representative of the fourth-order polynomial regression fit;
j) computing a difference between the re-entry time predictions from Steps g) (ii) and (iii);
k) forming an (x, y) pair wherein x is the difference obtained from Step j) and y is the y intercept from Step i) and plotting said (x, y) pair;
l) repeating Steps d) through k) to generate an additional (x, y) pair using a subsequently available Two Line Element within a set of h[120, 350], wherein h is the mean altitude of the spacecraft's reentry trajectory, with proviso that said subsequently available Two Line Element corresponds to an altitude h that is less than an altitude of the previous data point used to form the previous (x, y) pair;
m) plotting said (x, y) pairs and performing a linear regression fit on said plotted points to obtain a linear equation;

n) determining a y intercept of said linear equation which is designated as a re-entry time prediction of said spacecraft; and o) providing a notification via a communication system regarding the re-entry time prediction for said spacecraft.

2. A method of determining spacecraft reentry time comprising determining a y intercept of a linear equation which is designated as a re-entry time prediction of said spacecraft and providing a notification via a communication system regarding the re-entry time prediction for said spacecraft, said linear equation being generated by:

a) computing, based on a diameter or width of the spacecraft, a length of the spacecraft, and a mass of the spacecraft, a minimum and maximum reference area of a cylinder approximating spacecraft configuration;

b) computing, using the minimum and maximum reference area of said cylinder approximating the spacecraft configuration, the minimum reference area ($S_{min}$) which is an area of one end of said cylinder and computing the maximum reference area ($S_{max}$) which is a rectangular area projection of the cylinder's longitudinal axis;

c) incrementing an interval [$S_{min}$, $S_{max}$] to achieve from 10 drag reference area cases to 50 drag reference area cases;

d) taking, from a Two Line Element data for the spacecraft, a first available data point within a set of h[250, 350], wherein h is a mean altitude of the spacecraft's reentry trajectory and extracting values for time in elapsed days since epoch, mean anomaly in degrees, mean motion in revolutions per day, orbit inclination in degrees, argument of perigee in degrees, right ascension of an ascending node in degrees, and eccentricity which is unitless, then converting the mean anomaly, the orbit inclination, argument of perigee, and the right ascension of the ascending node in degrees to radians, and converting the mean motion from revolutions per day to radians per second;

e) computing, from the Two Line Element data, an inertial position vector ($\vec{r}^I$) and a velocity vector ($\vec{V}^I$) related to a spacecraft motion at a specified Two Line Element time from Step d), said velocity vector being converted to a quantity relative to the rotating Earth and said computation of the inertial position vector and the velocity vector using the following initial conditions, wherein a subscript "0" represents an initial condition and a symbol $\|\cdot\|$ is a vector magnitude operation:

$r_0 = \|\vec{r}^I\|$ $V^R = \|\vec{V}^R\|$ $\theta_0 = -10° = +0.17453$ rad $\phi_0 = -10° = -0.17453$ rad $\gamma_0 = (\pi/2) - \cos^{-1}[(\vec{r}^I \cdot \vec{V}^R)/(\|\vec{r}^I\|\|\vec{V}^R\|)]$ $\psi_0 = (\pi/2) - \cos^{-1}[(\vec{V}^R \cdot [0\ 0\ 1])/\|\vec{V}^R\|]$;

f) inserting the values ($r_0$), ($V^R$), ($\phi_0$), ($\phi_0$), ($\gamma_0$), and ($\psi_0$) from Step e) as initial conditions in Equations (1)-(10);

g) integrating Equations (1)-(6), until a trajectory radial position of the spacecraft, with respect to the center of the Earth, is equal to plus or minus 10 kilometres of the constant mean radius of the Earth, wherein the constant mean radius of the earth is 6378.137 km for the following cases:

(i) Reference Area Response Curve: every reference area increment in the interval [$S_{min}$; $S_{max}$] with $C_D$=2.5 and $C_L$=0.5 to yield a series of re-entry time predictions;

(ii) Lowest-Drag/Highest-Lift Condition: S=$S_{min}$, $C_D$=2.0, $C_L$=1.0 to yield a first re-entry time prediction;

(iii) Highest-Drag/Lowest-Lift Condition: S=$S_{max}$, $C_D$=3.0, $C_L$=0.1 to yield a second re-entry time prediction;

$$\dot{r} = V_R \sin\gamma \qquad (1)$$

$$\dot{\theta} = (V_R \cos\gamma \cos\psi)/(r\cos\phi) \qquad (2)$$

$$\dot{\phi} = V_R \cos\gamma \sin\psi/r \qquad (3)$$

$$\dot{V}_R = -(D/m) - g(r)\sin\gamma + r\omega_\oplus^2 \cos\phi(\cos\phi\sin\gamma - \sin\phi\sin\psi\cos\gamma) \qquad (4)$$

$$V_R\dot{\gamma} = (L/m)\cos\sigma - g(r)\cos\gamma + (V_R^2/r)\cos\gamma + 2V_R\omega_\oplus \cos\phi\cos\psi + r\omega_\oplus^2 \cos\phi(\cos\phi\cos\gamma - \sin\phi\sin\psi\sin\gamma) \qquad (5)$$

$$V_R\dot{\psi} = [(L\sin\sigma)/(m\cos\gamma)] - (V_R^2/r)\cos\gamma\cos\psi\tan\phi + 2V_R\omega_\oplus(\sin\psi\cos\phi\tan\gamma - \sin\phi) - [(r\omega_\oplus^2)/\cos\gamma]\sin\phi\cos\phi\cos\psi \qquad (6)$$

wherein a gravity term g and aerodynamic forces of drag (D) and lift (L) are computed, respectively, by the following:

$$g(r) = g_{SL}(r_\oplus/r)^2 \qquad (7)$$

$$D = \frac{1}{2}\rho C_D S V_R^2 \qquad (8)$$

$$L = \frac{1}{2}\rho C_L S V_R^2 \qquad (9)$$

wherein ρ for Equations (8) and (9) is calculated as follows:

$$\rho(h) = \begin{cases} \rho_{SL} e^{-\beta h}, & h < 84\,\text{km} \\ \rho_i\left[\left(1 + \delta_H\left(\frac{h - h_i}{r_\oplus}\right)\right)^{-1}\right]^{\frac{1+\alpha}{\alpha}}, & 84 \le h \le 120\,\text{km} \\ (4.50847623 \times 10^7) \cdot (h)^{-7.44605852}, & 120 < h \le 1000\,\text{km} \end{cases} \qquad (10)$$

the value for the inverse scale height β in the first function of Equation (10) is 0.14 km$^{-1}$ and the values for the parameters $\rho_i$, $\alpha$, and $\delta_H$ are:

| Altitude Section | $h_i$, km | $\rho_i$, kg/m$^3$ | $\alpha$ | $\delta_H$ |
|---|---|---|---|---|
| 84 ≤ h ≤ 90 km | 85 | 7.726 × 10$^{-6}$ | 0.1545455 | 197.9740 |
| 91 ≤ h ≤ 106 km | 99 | 4.504 × 10$^{-7}$ | 0.1189286 | 128.4577 |
| 107 ≤ h ≤ 120 km | 110 | 5.930 × 10$^{-8}$ | 0.5925240 | 432.8484 | h) plotting each re-entry time prediction from said series of re-entry time predictions obtained via Step g) (i) against each respective interval [$S_{min}$, $S_{max}$] used to generate each of said respective re-entry time predictions;

i) performing a fourth-order polynomial regression fit on the plot from Step h) and determining a y intercept of the resulting equation representative of the fourth-order polynomial regression fit;

j) computing a difference between the re-entry time predictions from Steps g) (ii) and (iii);

k) forming an (x, y) pair wherein x is the difference obtained from Step j) and y is the y intercept from Step i) and plotting said (x, y) pair;

l) repeating Steps d) through k) to generate an additional (x, y) pair using a subsequently available Two Line Element within a set of h[120, 350], wherein h is the mean altitude of the spacecraft's reentry trajectory, with proviso that said subsequently available Two Line Element corresponds to an altitude h that is less than an altitude of the previous data point used to form the previous (x, y) pair; and m) plotting said (x, y) pairs and performing a linear regression fit on said plotted points to obtain said linear equation.

3. A module comprising a central processing unit programmed to predict spacecraft reentry time by a method comprising:

a) computing, based on a diameter or width of a spacecraft, a length of the spacecraft, and a mass of the spacecraft, a minimum and maximum reference area of a cylinder approximating a spacecraft configuration;

b) computing, using the minimum and maximum reference area of said cylinder approximating the spacecraft configuration, the minimum reference area ($S_{min}$) which is an area of one end of said cylinder and computing the maximum reference area ($S_{max}$) which is a rectangular area projection of the cylinder's longitudinal axis;

c) incrementing an interval [$S_{min}$, $S_{max}$] to achieve from 10 drag reference area cases to 50 drag reference area cases;

d) taking, from a Two Line Element data for the spacecraft, a first available data point within a set of h[250, 350], wherein h is a mean altitude of the spacecraft's reentry trajectory and extracting values for time in elapsed days since epoch, mean anomaly in degrees, mean motion in revolutions per day, orbit inclination in degrees, argument of perigee in degrees, right ascension of an ascending node in degrees, and eccentricity which is unitless, then converting the mean anomaly, the orbit inclination, argument of perigee, and the right ascension of the ascending node in degrees to radians, and converting the mean motion from revolutions per day to radians per second;

e) computing, from the Two Line Element data, an inertial position vector ($\vec{r}^I$) and a velocity vector ($\vec{V}^I$) vectors related to a spacecraft motion at a specified Two Line Element time from Step d), said velocity vector being converted to a quantity relative to the rotating Earth and said computation of the inertial position vector and the velocity vector using the following initial conditions, wherein a subscript "0" represents an initial condition and a symbol $\|\cdot\|$ is a vector magnitude operation:

$r_0 = \|\vec{r}^I\|$ $V^R = \|\vec{V}^R\|$ $\theta_0 = -10° = +0.17453$ rad $\phi_0 = -10° = -0.17453$ rad $\gamma_0 = (\pi/2) - \cos^{-1}[(\vec{r}^I \cdot \vec{V}^R)/(\|\vec{r}^I\|\|\vec{V}^R\|)]$ $\psi_0 = (\pi/2) - \cos^{-1}[(\vec{V}^R \cdot [0\ 0\ 1])/\|\vec{V}^R\|]$;

f) inserting the values ($r_0$), ($V^R$), ($\phi_0$), ($\phi_0$), ($\gamma_0$), and ($\psi_0$) from step e) as initial conditions in Equations (1)-(10);

g) integrating Equations (1)-(6), until a trajectory radial position of the spacecraft, with respect to the center of the Earth, is equal to plus or minus 10 kilometres of the constant mean radius of the Earth, wherein the constant mean radius of the earth is 6378.137 km for the following cases:

(i) Reference Area Response Curve: every reference area increment in the interval [$S_{min}$; $S_{max}$] with $C_D$=2.5 and $C_L$=0.5 to yield a series of re-entry time predictions;

(ii) Lowest-Drag/Highest-Lift Condition: $S=S_{min}$, $C_D$=2.0, $C_L$=1.0 to yield a first re-entry time prediction;

(iii) Highest-Drag/Lowest-Lift Condition: $S=S_{max}$, $C_D$=3.0, $C_L$=0.1 to yield a second re-entry time prediction;

$$\dot{r} = V_R \sin \gamma \tag{1}$$

$$\dot{\theta} = (V_R \cos \gamma \cos \psi)/(r \cos \phi) \tag{2}$$

$$\dot{\phi} = V_R \cos \gamma \sin \psi / r \tag{3}$$

$$\dot{V}_R = -(D/m) - g(r)\sin \gamma + r\omega_\oplus^2 \cos \phi(\cos \phi \sin \gamma - \sin \phi \sin \psi \cos \gamma) \tag{4}$$

$$V_R\dot{\gamma} = (L/m)\cos \sigma - g(r)\cos \gamma + (V_R^2/r)\cos \gamma + 2V_R\omega_\oplus \cos \phi \cos \psi + r\omega_\oplus^2 \cos \phi(\cos \phi \cos \gamma - \sin \phi \sin \phi \sin \gamma) \tag{5}$$

$$V_R\dot{\psi} = [(L \sin \sigma)/(m \cos \gamma)] - (V_R^2/r)\cos \gamma \cos \psi \tan \phi + 2V_R\omega_\oplus(\sin \psi \cos \phi \tan \gamma - \sin \phi) - [(r\omega_\oplus^2)/\cos \gamma]\sin \phi \cos \phi \cos \psi \tag{6}$$

wherein a gravity term g and aerodynamic forces of drag (D) and lift (L) are computed, respectively, by the following:

$$g(r) = g_{SL}(r_\oplus/r)^2 \tag{7}$$

$$D = \frac{1}{2}\rho C_D S V_R^2 \tag{8}$$

$$L = \frac{1}{2}\rho C_L S V_R^2 \tag{9}$$

wherein ρ for Equations (8) and (9) is calculated as follows:

$$\rho(h) = \begin{cases} \rho_{SL} e^{-\beta h}, & h < 84\ \text{km} \\ \rho_i\left[\left(1 + \delta_H\left(\frac{h - h_i}{r_\oplus}\right)\right)^{-1}\right]^{\frac{1+\alpha}{\alpha}}, & 84 \leq h \leq 120\ \text{km} \\ (4.50847623 \times 10^7) \cdot (h)^{-7.44605852}, & 120 < h \leq 1000\ \text{km} \end{cases} \tag{10}$$

the value for the inverse scale height β in the first function of Equation (10) is 0.14 km$^{-1}$ and the values for the parameters $\rho_i$, α, and $\delta_H$ are:

| Altitude Section | $h_i$, km | $\rho_i$, kg/m³ | $\alpha$ | $\delta_H$ |
|---|---|---|---|---|
| 84 ≤ h ≤ 90 km | 85 | 7.726 × 10⁻⁶ | 0.1545455 | 197.9740 |
| 91 ≤ h ≤ 106 km | 99 | 4.504 × 10⁻⁷ | 0.1189286 | 128.4577 |
| 107 ≤ h ≤ 120 km | 110 | 5.930 × 10⁻⁸ | 0.5925240 | 432.8484 | h) plotting each re-entry time prediction from said series of re-entry time predictions obtained via Step g) (i) against each respective interval [$S_{min}$, $S_{max}$] used to generate each of said respective re-entry time predictions;

i) performing a fourth-order polynomial regression fit on the plot from Step h) and determining a y intercept of the resulting equation representative of the fourth-order polynomial regression fit;

j) computing a difference between the re-entry time predictions from Steps g) (ii) and (iii);

k) forming an (x, y) pair wherein x is the difference obtained from Step j) and y is the y intercept from Step i) and plotting said (x, y) pair;

l) repeating Steps d) through k) to generate an additional (x, y) pair using a subsequently available Two Line Element within a set of h[120, 350], wherein h is the mean altitude of the spacecraft's reentry trajectory, with proviso that said subsequently available Two Line Element corresponds to an altitude h that is less than an altitude of the previous data point used to form the previous (x, y) pair;

m) plotting said (x, y) pairs and performing a linear regression fit on said plotted points to obtain a linear equation; and n) determining a y intercept of said linear equation which is designated as a re-entry time prediction of said spacecraft;

said central processing unit further programmed to provide a notification via a communication system regarding the re-entry time prediction for said spacecraft.

4. The module of claim 3 said module comprising an input/output controller, a random access memory unit, a hard drive memory unit, and a unifying computer bus system, said input/output controller being configured to receive a digital signal and transmit said digital signal to said central processing unit and retrieve a signal comprising the re-entry time prediction for said spacecraft from said central processing unit.

5. A module comprising a central processing unit programmed to predict spacecraft reentry time by a method comprising determining a y intercept of a linear equation which is designated as a re-entry time prediction of said spacecraft and providing a notification via a communication system regarding the re-entry time prediction for said spacecraft, said linear equation being generated by:

a) computing, based on a diameter or width of the spacecraft, a length of the spacecraft, and a mass of the spacecraft, a minimum and maximum reference area of a cylinder approximating spacecraft configuration;

b) computing, using the minimum and maximum reference area of said cylinder approximating the spacecraft configuration, the minimum reference area ($S_{min}$) which is an area of one end of said cylinder and computing the maximum reference area ($S_{max}$) which is a rectangular area projection of the cylinder's longitudinal axis;

c) incrementing an interval [$S_{min}$, $S_{max}$] to achieve from 10 drag reference area cases to 50 drag reference area cases;

d) taking, from a Two Line Element data for the spacecraft, a first available data point within the set of h[250, 350], wherein h is a mean altitude of the spacecraft's reentry trajectory and extracting values for time in elapsed days since epoch, mean anomaly in degrees, mean motion in revolutions per day, orbit inclination in degrees, argument of perigee in degrees, right ascension of an ascending node in degrees, and eccentricity which is unitless, then converting the mean anomaly, the orbit inclination, argument of perigee, and the right ascension of the ascending node in degrees to radians, and converting mean motion from revolutions per day to radians per second;

e) computing, from the Two Line Element data, an inertial position vector ($\vec{r}^I$) and a velocity vector ($\vec{V}^I$) vectors related to a spacecraft motion at a specified Two Line Element time from Step d), said velocity vector being converted to a quantity relative to the rotating Earth and said computation of the inertial position vector and the velocity vector using the following initial conditions, wherein a subscript "0" represents an initial condition and a symbol $\|\cdot\|$ is a vector magnitude operation:

$r_0 = \|\vec{r}^I\|$ $V^R = \|\vec{V}^R\|$ $\theta_0 = -10° = +0.17453$ rad $\phi_0 = -10° = -0.17453$ rad $\gamma_0 = (\pi/2) - \cos^{-1}[(\vec{r}^I \cdot \vec{V}^R)/(\|\vec{r}^I\|\|\vec{V}^R\|)]$ $\psi_0 = (\pi/2) - \cos^{-1}[(\vec{V}^R \cdot [0\ 0\ 1])/\|\vec{V}^R\|];$ f) inserting the values ($r_0$), ($V^R$), ($\phi_0$), ($\phi_0$), ($\gamma_0$), and ($\psi_0$) from Step e) as initial conditions in Equations (1)-(10);

g) integrating Equations (1)-(6), until a trajectory radial position of the spacecraft, with respect to the center of the Earth, is equal to plus or minus 10 kilometres of the constant mean radius of the Earth, wherein the constant mean radius of the earth is 6378.137 km for the following cases:

(i) Reference Area Response Curve: every reference area increment in the interval [$S_{min}$; $S_{max}$] with $C_D=2.5$ and $C_L=0.5$ to yield a series of re-entry time predictions;

(ii) Lowest-Drag/Highest-Lift Condition: $S=S_{min}$, $C_D=2.0$, $C_L=1.0$ to yield a first re-entry time prediction;

(iii) Highest-Drag/Lowest-Lift Condition: $S=S_{max}$, $C_D=3.0$, $C_L=0.1$ to yield a second re-entry time prediction;

$$\dot{r} = V_R \sin \gamma \quad (1)$$

$$\dot{\theta} = (V_R \cos \gamma \cos \psi)/(r \cos \phi) \quad (2)$$

$$\dot{\phi} = V_R \cos \gamma \sin \psi / r \quad (3)$$

$$\dot{V}_R = -(D/m) - g(r)\sin \gamma + r\omega_\oplus^2 \cos \phi(\cos \phi \sin \gamma - \sin \phi \sin \psi \cos \gamma) \quad (4)$$

$$V_R \dot{\gamma} = (L/m)\cos \sigma - g(r)\cos \gamma + (V_R^2/r)\cos \gamma + 2V_R\omega_\oplus \cos \phi \cos \psi + r\omega_\oplus^2 \cos \phi(\cos \phi \cos \gamma - \sin \phi \sin \phi \sin \gamma) \quad (5)$$

$$V_R\dot{\psi} = [(L \sin \sigma)/(m \cos \gamma)] - (V_R^2/r)\cos \gamma \cos \psi \tan \phi + 2V_R\omega_\oplus(\sin \psi \cos \phi \tan \gamma - \sin \phi) - [(r\omega_\oplus^2)/\cos \gamma]\sin \phi \cos \phi \cos \psi \quad (6)$$

wherein a gravity term g and aerodynamic forces of drag (D) and lift (L) are computed, respectively, by the following:

$$g(r) = g_{SL}(r_\oplus/r)^2 \quad (7)$$

$$D = \frac{1}{2}\rho C_D S V_R^2 \quad (8)$$

$$L = \frac{1}{2}\rho C_L S V_R^2 \quad (9)$$

wherein ρ for Equations (8) and (9) is calculated as follows:

$$\rho(h) = \begin{cases} \rho_{SL}e^{-\beta h}, & h < 84 \text{ km} \\ \rho_i\left[\left(1+\delta_H\left(\frac{h-h_i}{r_\oplus}\right)\right)^{-1}\right]^{\frac{1+\alpha}{\alpha}}, & 84 \le h \le 120 \text{ km} \\ (4.50847623 \times 10^7)\cdot(h)^{-7.44605852}, & 120 < h \le 1000 \text{ km} \end{cases} \quad (10)$$

the value for the inverse scale height β in the first function of Equation (10) is 0.14 km$^{-1}$ and the values for the parameters $\rho_i$, α, and $\delta_H$ are:

| Altitude Section | $h_i$, km | $\rho_i$, kg/m³ | α | $\delta_H$ |
|---|---|---|---|---|
| 84 ≤ h ≤ 90 km | 85 | 7.726 × 10⁻⁶ | 0.1545455 | 197.9740 |
| 91 ≤ h ≤ 106 km | 99 | 4.504 × 10⁻⁷ | 0.1189286 | 128.4577 |
| 107 ≤ h ≤ 120 km | 110 | 5.930 × 10⁻⁸ | 0.5925240 | 432.8484 | h) plotting each re-entry time prediction from said series of re-entry time predictions obtained via Step g) (i) against each respective interval [$S_{min}$, $S_{max}$] used to generate each of said respective re-entry time predictions;

i) performing a fourth-order polynomial regression fit on the plot from Step h) and determining a y intercept of the resulting equation representative of the fourth-order polynomial regression fit;

j) computing a difference between the re-entry time predictions from Steps g) (ii) and (iii);

k) forming an (x, y) pair wherein x is the difference obtained from Step j) and y is the y intercept from Step i) and plotting said (x, y) pair;

l) repeating Steps d) through k) to generate an additional (x, y) pair using a subsequently available Two Line Element within a set of h[120, 350], wherein h is the mean altitude of the spacecraft's reentry trajectory, with proviso that said subsequently available Two Line Element corresponds to an altitude h that is less than an altitude of the previous data point used to form the previous (x, y) pair; and m) plotting said (x, y) pairs and performing a linear regression fit on said plotted points to obtain said linear equation.

6. The module of claim 5 said module comprising an input/output controller, a random access memory unit, a hard drive memory unit, and a unifying computer bus system, said input/output controller being configured to receive a digital signal and transmit said digital signal to said central processing unit and retrieve a signal comprising the re-entry time prediction for said spacecraft from said central processing unit.

7. An early warning re-entry system comprising:

a) a module comprising a central processing unit, an input/output controller, a random access memory unit, a hard drive memory unit, and a unifying computer bus system, said input/output controller being configured to receive a digital signal and transmit said digital signal to said central processing unit and retrieve a signal comprising the re-entry time prediction for said spacecraft from said central processing unit; said central processing unit programmed to predict spacecraft re-entry time by a method comprising:

computing, based on a diameter or width of a spacecraft, a length of the spacecraft, and a mass of the spacecraft, a minimum and maximum reference area of a cylinder approximating a spacecraft configuration;

(ii) computing, using the minimum and maximum reference area of said cylinder approximating the spacecraft configuration, the minimum reference area ($S_{min}$) which is an area of one end of said cylinder and computing the maximum reference area ($S_{max}$) which is a rectangular area projection of the cylinder's longitudinal axis;

(iii) incrementing an interval [$S_{min}$, $S_{max}$] to achieve from 10 drag reference area cases to 50 drag reference area cases;

(iv) taking, from a Two Line Element data for the spacecraft, a first available data point within a set of h[250, 350], wherein h is a mean altitude of the spacecraft's reentry trajectory and extracting values for time in elapsed days since epoch, mean anomaly in degrees, mean motion in revolutions per day, orbit inclination in degrees, argument of perigee in degrees, right ascension of an ascending node in degrees, and eccentricity which is unitless, then converting the mean anomaly, the orbit inclination, argument of perigee, and the right ascension of the ascending node in degrees to radians, and converting the mean motion from revolutions per day to radians per second;

(v) computing, from the Two Line Element data, an inertial position vector ($\vec{r}^I$) and a velocity vector ($\vec{V}^I$) vectors related to a spacecraft motion at a specified Two Line Element time from Step (iv), said velocity vector being converted to a quantity relative to the rotating Earth and said computation of the inertial position vector and the velocity vector using the following initial conditions, wherein a subscript "0" represents an initial condition and a symbol ||•|| is a vector magnitude operation:

$$r_0 = \|\vec{r}^I\|$$

$$V^R = \|\vec{V}^R\|$$

$$\theta_0 = -10° = +0.17453 \text{ rad}$$

$$\phi_0 = -10° = -0.17453 \text{ rad}$$

$$\gamma_0 = (\pi/2) - \cos^{-1}[(\vec{r}^I \cdot \vec{V}^R)/(\|\vec{r}^I\|\|\vec{V}^R\|)]$$

$$\psi_0 = (\pi/2) - \cos^{-1}[(\vec{V}^R \cdot [0\ 0\ 1])/\|\vec{V}^R\|];$$

(vi) inserting the values ($r_0$), ($V^R$), ($\phi_0$), ($\phi_0$), ($\gamma_0$), and ($\psi_0$) from step (v) as initial initial conditions in Equations (1)-(10);

(vii) integrating Equations (1)-(6), until a trajectory radial position of the spacecraft, with respect to the center of the Earth, is equal to plus or minus 10 kilometres of the constant mean radius of the Earth, wherein the constant mean radius of the earth is 6378.137 km for the following cases:
(aa) Reference Area Response Curve: every reference area increment in the interval [$S_{min}$; $S_{max}$] with $C_D$=2.5 and $C_L$=0.5 to yield a series of re-entry time predictions;
(bb) Lowest-Drag/Highest-Lift Condition: $S=S_{min}$, $C_D$=2.0, $C_L$=1.0 to yield a first re-entry time prediction;
(cc) Highest-Drag/Lowest-Lift Condition: $S=S_{max}$, $C_D$=3.0, $C_L$=0.1 to yield a second re-entry time prediction;

$$\dot{r}=V_R \sin \gamma \qquad (1)$$

$$\dot{\theta}=(V_R \cos \gamma \cos \psi)/(r \cos \phi) \qquad (2)$$

$$\dot{\phi}=V_R \cos \gamma \sin \psi/r \qquad (3)$$

$$\dot{V}_R=-(D/m)-g(r)\sin \gamma + r\omega_\oplus^2 \cos \phi(\cos \phi \sin \gamma - \sin \phi \sin \psi \cos \gamma) \qquad (4)$$

$$V_R\dot{\gamma}=(L/m)\cos \sigma - g(r)\cos \gamma + (V_R^2/r)\cos \gamma + 2V_R\omega_\oplus \cos \phi \cos \psi + r\omega_\oplus^2 \cos \phi(\cos \phi \cos \gamma - \sin \phi \sin \phi \sin \gamma) \qquad (5)$$

$$V_R\dot{\psi}=[(L \sin \sigma)/(m \cos \gamma)]-(V_R^2/r)\cos \gamma \cos \psi \tan \phi + 2V_R\omega_\oplus(\sin \psi \cos \phi \tan \gamma - \sin \phi)-[(r\omega_\oplus^2)/\cos \gamma]\sin \phi \cos \phi \cos \psi \qquad (6)$$

wherein a gravity term g and aerodynamic forces of drag (D) and lift (L) are computed, respectively, by the following:

$$g(r)=g_{SL}(r_\oplus/r)^2 \qquad (7)$$

$$D = \frac{1}{2}\rho C_D S V_R^2 \qquad (8)$$

$$L = \frac{1}{2}\rho C_L S V_R^2 \qquad (9)$$

wherein ρ for Equations (8) and (9) is calculated as follows:

$$\rho(h) = \begin{cases} \rho_{SL} e^{-\beta h}, & h < 84 \text{ km} \\ \rho_i\left[\left(1+\delta_H\left(\frac{h-h_i}{r_\oplus}\right)\right)^{-1}\right]^{\frac{1+\alpha}{\alpha}}, & 84 \le h \le 120 \text{ km} \\ (4.50847623 \times 10^7)\cdot(h)^{-7.44605852}, & 120 < h \le 1000 \text{ km} \end{cases} \qquad (10)$$

the value for the inverse scale height β in the first function of Equation (10) is 0.14 km$^{-1}$ and the values for the parameters $\rho_i$, α, and $\delta_H$ are:

| Altitude Section | $h_i$, km | $\rho_i$, kg/m³ | α | $\delta_H$ |
| --- | --- | --- | --- | --- |
| 84 ≤ h ≤ 90 km | 85 | 7.726 × 10$^{-6}$ | 0.1545455 | 197.9740 |
| 91 ≤ h ≤ 106 km | 99 | 4.504 × 10$^{-7}$ | 0.1189286 | 128.4577 |
| 107 ≤ h ≤ 120 km | 110 | 5.930 × 10$^{-8}$ | 0.5925240 | 432.8484 |

(viii) plotting each re-entry time prediction from said series of re-entry time predictions obtained via Step (vii) (aa) against each respective interval [$S_{min}$, $S_{max}$] used to generate each of said respective re-entry time predictions;
(ix) performing a fourth-order polynomial regression fit on the plot from Step (viii) and determining a y intercept of the resulting equation representative of the fourth-order polynomial regression fit;
(x) computing a difference between the re-entry time predictions from Steps (vii) (bb) and (cc);
(xi) forming an (x, y) pair wherein x is the difference obtained from Step (x) and y is the y intercept from Step (ix) and plotting said (x, y) pair;
(xii) repeating Steps (iv) through (xi) to generate an additional (x, y) pair using a subsequently available Two Line Element within a set of h[120, 350], wherein h is the mean altitude of the spacecraft's reentry trajectory, with proviso that said subsequently available Two Line Element corresponds to an altitude h that is less than an altitude of the previous data point used to form the previous (x, y) pair;
(xiii) plotting said (x, y) pairs and performing a linear regression fit on said plotted points to obtain a linear equation;
(xiv) determining a y intercept of said linear equation which is designated as the re-entry time prediction of said spacecraft;
said central processing unit further programmed to provide a notification via a communication system regarding the re-entry time prediction for said spacecraft;
b) a transmitter for transmitting the re-entry time prediction of said spacecraft provided by said module to a communication network; and
c) at least one of an internal power source and an external power source for powering said early warning re-entry system.

8. An early warning reentry system comprising:
a) a module comprising a central processing unit, an input/output controller, a random access memory unit, a hard drive memory unit, and a unifying computer bus system, said input/output controller being configured to receive a digital signal and transmit said digital signal to said central processing unit and retrieve a signal comprising a re-entry time prediction for a spacecraft from said central processing unit; said central processing unit programmed to predict spacecraft re-entry time by a method comprising determining a y intercept of a linear equation which is designated as the re-entry time prediction of said spacecraft and providing a notification via a communication system regarding the re-entry time prediction for said spacecraft, said linear equation being generated by:
(i) computing, based on a diameter or width of the spacecraft, a length of the spacecraft, and a mass of the spacecraft, a minimum and maximum reference area of a cylinder approximating spacecraft configuration;
(ii) computing, using the minimum and maximum reference area of said cylinder approximating the spacecraft configuration, the minimum reference area ($S_{min}$) which is an area of one end of said cylinder and computing the maximum reference area ($S_{max}$) which is a rectangular area projection of the cylinder's longitudinal axis;
(iii) incrementing an interval [$S_{min}$, $S_{max}$] to achieve from 10 drag reference area cases to 50 drag reference area cases;

(iv) taking, from a Two Line Element data for the spacecraft, a first available data point within a set of h[250, 350], wherein h is a mean altitude of the spacecraft's reentry trajectory and extracting values for time in elapsed days since epoch, mean anomaly in degrees, mean motion in revolutions per day, orbit inclination in degrees, argument of perigee in degrees, right ascension of an ascending node in degrees, and eccentricity which is unitless, then converting the mean anomaly, the orbit inclination, argument of perigee, and the right ascension of the ascending node in degrees to radians, and converting mean motion from revolutions per day to radians per second;

(v) computing, from the Two Line Element data, an inertial position vector ($\vec{r}^I$) and a velocity vector ($\vec{V}^I$) vectors related to a spacecraft motion at a specified Two Line Element time from Step (iv), said velocity vector being converted to a quantity relative to the rotating Earth and said computation of the inertial position vector and the velocity vector using the following initial conditions, wherein a subscript "0" represents an initial condition and a symbol $\|\cdot\|$ is a vector magnitude operation:

$r_0 = \|\vec{r}^I\|$ $V^R = \|\vec{V}^R\|$ $\theta_0 = -10° = +0.17453 \text{ rad}$ $\phi_0 = -10° = -0.17453 \text{ rad}$ $\gamma_0 = (\pi/2) - \cos^{-1}[(\vec{r}^I \cdot \vec{V}^R)/(\|\vec{r}^I\|\|\vec{V}^R\|)]$ $\psi_0 = (\pi/2) - \cos^{-1}[(\vec{V}^R \cdot [0\ 0\ 1])/\|\vec{V}^R\|];$ (vi) inserting the values ($r_0$), ($V^R$), ($\phi_0$), ($\phi_0$), ($\gamma_0$), and ($\psi_0$) from step (v) as initial conditions in Equations (1)-(10);

(vii) integrating Equations (1)-(6), until a trajectory radial position of the spacecraft, with respect to the center of the Earth, is equal to plus or minus 10 kilometres of the constant mean radius of the Earth, wherein the constant mean radius of the earth is 6378.137 km for the following cases:
  (aa) Reference Area Response Curve: every reference area increment in the interval [$S_{min}$; $S_{max}$] with $C_D=2.5$ and $C_L=0.5$ to yield a series of re-entry time predictions;
  (bb) Lowest-Drag/Highest-Lift Condition: $S=S_{min}$, $C_D=2.0$, $C_L=1.0$ to yield a first re-entry time prediction;
  (cc) Highest-Drag/Lowest-Lift Condition: $S=S_{max}$, $C_D=3.0$, $C_L=0.1$ to yield a second re-entry time prediction;

$\dot{r} = V_R \sin \gamma$  (1)

$\dot{\theta} = (V_R \cos \gamma \cos \psi)/(r \cos \phi)$  (2)

$\dot{\phi} = V_R \cos \gamma \sin \psi / r$  (3)

$\dot{V}_R = -(D/m) - g(r)\sin \gamma + r\omega_\oplus^2 \cos \phi(\cos \phi \sin \gamma - \sin \phi \sin \psi \cos \gamma)$  (4)

$V_R\dot{\gamma} = (L/m)\cos \sigma - g(r)\cos \gamma + (V_R^2/r)\cos \gamma + 2V_R\omega_\oplus \cos \phi \cos \psi + r\omega_\oplus^2 \cos \phi(\cos \phi \cos \gamma - \sin \phi \sin \psi \sin \gamma)$  (5)

$V_R\dot{\psi} = [(L \sin \sigma)/(m \cos \gamma)] - (V_R^2/r)\cos \gamma \cos \psi \tan \phi + 2V_R\omega_\oplus(\sin \psi \cos \phi \tan \gamma - \sin \phi) - [(r\omega_\oplus^2)/\cos \gamma]\sin \phi \cos \phi \cos \psi$  (6)

wherein a gravity term g and aerodynamic forces of drag (D) and lift (L) are computed, respectively, by the following:

$g(r) = g_{SL}(r_\oplus/r)^2$  (7)

$D = \frac{1}{2}\rho C_D S V_R^2$  (8)

$L = \frac{1}{2}\rho C_L S V_R^2$  (9)

wherein $\rho$ for Equations (8) and (9) is calculated as follows:

$$\rho(h) = \begin{cases} \rho_{SL} e^{-\beta h}, & h < 84 \text{ km} \\ \rho_i\left[\left(1 + \delta_H\left(\frac{h-h_i}{r_\oplus}\right)\right)^{-1}\right]^{\frac{1+\alpha}{\alpha}}, & 84 \leq h \leq 120 \text{ km} \\ (4.50847623 \times 10^7) \cdot (h)^{-7.44605852}, & 120 < h \leq 1000 \text{ km} \end{cases}$$ (10)

the value for the inverse scale height $\beta$ in the first function of Equation (10) is 0.14 km$^{-1}$ and the values for the parameters $\rho_i$, $\alpha$, and $\delta_H$ are:

| Altitude Section | $h_i$, km | $\rho_i$, kg/m³ | $\alpha$ | $\delta_H$ |
|---|---|---|---|---|
| 84 ≤ h ≤ 90 km | 85 | 7.726 × 10⁻⁶ | 0.1545455 | 197.9740 |
| 91 ≤ h ≤ 106 km | 99 | 4.504 × 10⁻⁷ | 0.1189286 | 128.4577 |
| 107 ≤ h ≤ 120 km | 110 | 5.930 × 10⁻⁸ | 0.5925240 | 432.8484 |

(viii) plotting each re-entry time prediction from said series of re-entry time predictions obtained via Step (vii) (aa) against each respective interval [$S_{min}$, $S_{max}$] used to generate each of said respective re-entry time predictions;

(ix) performing a fourth-order polynomial regression fit on the plot from Step (viii) and determining a y intercept of the resulting equation representative of the fourth-order polynomial regression fit;

(x) computing a difference between the re-entry time predictions from Steps (vii) (bb) and (cc);

(xi) forming an (x, y) pair wherein x is the difference obtained from Step (x) and y is the y intercept from Step (ix) and plotting said (x, y) pair;

(xii) repeating Steps (iv) through (xi) to generate an additional (x, y) pair using a subsequently available Two Line Element within a set of h[120, 350], wherein h is the mean altitude of the spacecraft's reentry trajectory, with proviso that said subsequently available Two Line Element corresponds to an altitude h that is less than an altitude of the previous data point used to form the previous (x, y) pair; and (xiii) plotting said (x, y) pairs and performing a linear regression fit on said plotted points to obtain said linear equation;

b) a transmitter for transmitting the re-entry time prediction of said spacecraft provided by said module to a communication network; and c) at least one of an internal power source and an external power source for powering said early warning re-entry system.

* * * * *